(12) United States Patent
Turner (10) Patent No.: US 9,436,944 B2
(45) Date of Patent: Sep. 6, 2016

(54) ELECTRIC VEHICLE CHARGING STATION MOBILE DEVICE PAYMENT SYSTEM

(71) Applicant: Optimization Technologies, Inc., Portland, OR (US)

(72) Inventor: Dexter Turner, West Linn, OR (US)

(73) Assignee: Optimization Technologies, Inc., Portland, OR (US)

( * ) Notice: Subject to any disclaimer, the term of this patent is extended or adjusted under 35 U.S.C. 154(b) by 0 days.

(21) Appl. No.: 14/014,108

(22) Filed: Aug. 29, 2013

(65) Prior Publication Data

US 2014/0067680 A1 Mar. 6, 2014

Related U.S. Application Data

(60) Provisional application No. 61/694,647, filed on Aug. 29, 2012.

(51) Int. Cl.

| | |
|---|---|
| *G06Q 20/40* | (2012.01) |
| *G06Q 20/14* | (2012.01) |
| *G06Q 20/32* | (2012.01) |
| *G06Q 20/42* | (2012.01) |
| *G07F 15/00* | (2006.01) |

(52) U.S. Cl.
CPC ............ *G06Q 20/40* (2013.01); *G06Q 20/145* (2013.01); *G06Q 20/3276* (2013.01); *G06Q 20/401* (2013.01); *G06Q 20/425* (2013.01); *G07F 15/005* (2013.01); *Y02T 90/12* (2013.01); *Y02T 90/128* (2013.01)

(58) Field of Classification Search
None
See application file for complete search history.

(56) References Cited

U.S. PATENT DOCUMENTS

| | | |
|---|---|---|
| 4,532,418 A | 7/1985 | Meese et al. |
| 5,202,617 A | 4/1993 | Nor |
| 5,306,999 A | 4/1994 | Hoffman |
| 5,327,066 A | 7/1994 | Smith |
| 5,369,352 A | 11/1994 | Toepfer et al. |
| 5,821,731 A | 10/1998 | Kuki et al. |
| 6,225,776 B1 | 5/2001 | Chai |
| 6,727,809 B1 | 4/2004 | Smith |
| 7,256,516 B2 | 8/2007 | Buchanan et al. |
| 7,702,540 B1 | 4/2010 | Woolston |
| 7,956,570 B2 | 6/2011 | Lowenthal et al. |
| 8,179,086 B2 | 5/2012 | Nakaso et al. |
| 8,301,322 B2 | 10/2012 | Mitsutani |
| 8,476,865 B2 | 7/2013 | Iwanaga et al. |
| 8,493,025 B2 | 7/2013 | Turner |
| 8,558,504 B2 | 10/2013 | Brown et al. |
| 8,564,454 B2 | 10/2013 | Oizumi et al. |
| 8,604,750 B2 | 12/2013 | Turner et al. |
| 8,618,767 B2 | 12/2013 | Ishii et al. |
| 8,710,798 B2 | 4/2014 | Turner |
| 9,067,503 B2 | 6/2015 | Turner |

(Continued)

FOREIGN PATENT DOCUMENTS

| | | |
|---|---|---|
| WO | WO 2009/091745 | 7/2009 |
| WO | WO 2010/011545 | 1/2010 |
| WO | WO 2010/051477 | 5/2010 |

*Primary Examiner* — Kimberly Berona
*Assistant Examiner* — Joseph W King
(74) *Attorney, Agent, or Firm* — Klarquist Sparkman, LLP (57) ABSTRACT

Disclosed herein are representative embodiments of methods, apparatus, and systems for a mobile device payment system for electric vehicle charging stations ("EVCSs") or electric vehicle supply equipment ("EVSE"). This system can be used to control the access to EVCS or EVSE and to ensure proper billing for the use of EVCS or EVSE.

14 Claims, 7 Drawing Sheets

(56) References Cited

U.S. PATENT DOCUMENTS

| | | |
|---|---|---|
| 9,180,783 B1 * | 11/2015 | Penilla ................ B60L 11/1824 |
| 9,180,784 B2 | 11/2015 | Turner et al. |
| 2004/0233055 A1 | 11/2004 | Canich et al. |
| 2009/0287578 A1 | 11/2009 | Paluszek et al. |
| 2009/0313032 A1 | 12/2009 | Hafner et al. |
| 2010/0010698 A1 | 1/2010 | Iwashita et al. |
| 2010/0013434 A1 | 1/2010 | Taylor-Haw et al. |
| 2010/0013436 A1 | 1/2010 | Lowenthal et al. |
| 2010/0039067 A1 | 2/2010 | Hill et al. |
| 2010/0106631 A1 | 4/2010 | Kurayama et al. |
| 2010/0161481 A1 | 6/2010 | Littrell |
| 2010/0181959 A1 | 7/2010 | Gibbs et al. |
| 2010/0211643 A1 | 8/2010 | Lowenthal et al. |
| 2010/0213896 A1 | 8/2010 | Ishii et al. |
| 2011/0106329 A1 | 5/2011 | Donnelly et al. |
| 2011/0131083 A1 | 6/2011 | Redmann et al. |
| 2011/0140656 A1 | 6/2011 | Starr et al. |
| 2011/0169447 A1 | 7/2011 | Brown et al. |
| 2011/0204847 A1 | 8/2011 | Turner |
| 2011/0208953 A1 * | 8/2011 | Solomon et al. ................ 713/2 |
| 2011/0213656 A1 | 9/2011 | Turner |
| 2011/0238861 A1 | 9/2011 | Hutchinson |
| 2011/0239116 A1 | 9/2011 | Turner et al. |
| 2011/0258112 A1 | 10/2011 | Eder et al. |
| 2012/0041855 A1 | 2/2012 | Sterling et al. |
| 2012/0130891 A1 * | 5/2012 | Bogaard et al. ................ 705/40 |
| 2012/0233077 A1 | 9/2012 | Tate et al. |
| 2012/0271723 A1 | 10/2012 | Penilla et al. |
| 2012/0319651 A1 | 12/2012 | Outwater et al. |
| 2013/0043306 A1 * | 2/2013 | Acosta-Cazaubon et al. ............................ 235/382 |
| 2013/0262275 A1 | 10/2013 | Outwater et al. |
| 2013/0300362 A1 | 11/2013 | Turner |
| 2014/0067492 A1 | 3/2014 | Turner |
| 2014/0067493 A1 | 3/2014 | Turner |
| 2014/0074523 A1 | 3/2014 | Turner |
| 2014/0097795 A1 | 4/2014 | Turner et al. |

* cited by examiner

ELECTRIC VEHICLE CHARGING STATION MOBILE DEVICE PAYMENT SYSTEM

CROSS REFERENCE TO RELATED APPLICATION

This application claims the benefit of U.S. Provisional Application No. 61/694,647, filed on Aug. 29, 2012, and entitled "ELECTRIC VEHICLE CHARGING STATION MOBILE DEVICE PAYMENT SYSTEM", which is hereby incorporated herein by reference.

FIELD

This application relates to electric vehicle charging stations and associated systems.

SUMMARY

Disclosed below are representative embodiments of methods, apparatus, and systems relating to a mobile device payment system for electric vehicle charging stations ("EVCSs") and electric vehicle supply equipment ("EVSE"). The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. Furthermore, any features or aspects of the disclosed embodiments can be used in various combinations and subcombinations with one another.

Among the embodiments disclosed herein are electric vehicle charging station systems that control access to and payment for the use of the charging stations via mobile devices. Embodiments of the disclosed technology can be used to improve the basic process of connecting an electric vehicle to the power grid with an EVCS/EVSE for charging purposes by using mobile device payments to eliminate the need to carry credit/debit cards, club cards, radio frequency identification ("RFID") devices or some other access control device. Certain embodiments of the disclosed technology comprise an access control and payment system that uses a customer's existing mobile device and a display apparatus on the EVCS/EVSE. In certain situations, at the time the driver plugs their EV in to receive an electrical charge, unless it is a fixed price session, the price of the charging session will not be known. Therefore, in some embodiments of the disclosed technology, the charging system accommodates scenarios in which the cost of the service is known or unknown at the time of authorization.

Certain embodiments of the disclosed technology are built around a mobile device app running on the EV driver's Internet-connected mobile device. One or more of the following components can make up the system:

- An application running on the EV driver's mobile device that includes a login feature that the EV driver can use to authenticate their identity to the application by entering a login ID and password, or some other method to uniquely identify themselves. This application will hereinafter be referred to as the EVSE mobile device payment app ("MPA");
- An EVSE that includes Internet connectivity
- A display apparatus on the EVSE that displays either a Quick Response ("QR") Code, bar code, or alpha-numeric code that can be scanned by the MPA;
- A back-office software system that allows EV divers to create accounts that are linked to their credit card or debit card or a bank account for the purpose of paying for EV charging.

Embodiments of the disclosed systems and methods can be implemented using computing hardware, such as a computer processor embedded in the EVCS/EVSE and/or a mobile computing device. For example, embodiments of the disclosed methods can be performed using software stored on one or more non-transitory computer-readable media (e.g., one or more optical media discs, volatile memory components (such as DRAM or SRAM), or nonvolatile memory or storage components (such as hard drives)). Such software can be executed by a computer processor embedded in the EVCS/EVSE, a computer processor in a mobile device (such as a smart phone, tablet computer, or the like), or by one or more computers coupled to the EVCS/EVSE by a network (e.g., via the Internet, a wide-area network, a local-area network, a client-server network, or other such network). Embodiments of the disclosed methods can also be performed by specialized computing hardware (e.g., one or more application specific integrated circuits ("ASICs") or programmable logic devices (such as field programmable gate arrays ("FPGAs")) configured to perform any of the disclosed methods). Additionally, any intermediate or final result created or modified using any of the disclosed methods can be stored on a non-transitory storage medium (e.g., one or more optical media discs, volatile memory or storage components (such as DRAM or SRAM), or nonvolatile memory or storage components (such as hard drives)). Furthermore, any of the software embodiments (comprising, for example, computer-executable instructions which when executed by a computer cause the computer to perform any of the disclosed methods) or results (either intermediate or final) created or modified by the disclosed methods can be transmitted, received, or accessed through a suitable communication means.

One exemplary embodiment disclosed herein is a method comprising displaying a charging session code (e.g., a QR code, barcode, or alphanumeric code) on a touch screen of an electric vehicle charging station ("EVCS") or electric vehicle supply equipment ("EVSE"). Another embodiment comprises reading this code with a mobile payment application running on an internet-connected mobile device.

Another exemplary embodiment comprises one or more computer-readable media storing computer-executable instructions which when executed by a computer cause the computer to provide the display of a charging session code (e.g., a QR code, barcode or alpha-numeric code) on a touch screen of an EVCS or EVSE. A further embodiment comprises one or more computer-readable media storing computer-executable instructions which when executed by an Internet-connected mobile device cause the mobile device to read a charging session code and interact with a remote server to transmit this code and the user's data.

Another exemplary embodiment is a method comprising receiving data from an EVCS or EVSE, the data identifying a user at the EVCS or EVSE and identifying a unique charging session at the EVCS or EVSE; and using computing hardware, accessing account data associated with the user and access control policies and pricing data associated with the EVCS or EVSE and using the combination of this data to determine if the user is authorized to complete a charging session at the EVCS or EVSE. A related embodiment comprises one or more computer-readable media storing computer-executable instructions which when executed by a computer cause the computer to perform the method.

A further embodiment is a computer configured to receive data from an EVCS or EVSE, the data identifying a user at the EVCS or EVSE and identifying a unique charging session at the EVCS or EVSE, and to access account data associated with the user and access control and payment data associated with the charging station.

Another exemplary embodiment is a method comprising, using computing hardware, sending user data associated with a user at an EVCS or EVSE and charging session data to a back office computer; and using the computing hardware, receiving authorization data from the back office computer, the authorization data indicating that the user is authorized to use the EVCS or EVSE. A related embodiment comprises one or more computer-readable media storing computer-executable instructions which when executed by a computer cause the computer to perform the method.

A further embodiment is an EVCS or EVSE comprising computing hardware configured to send user data associated with a user at an EVCS or EVSE and charging session data to a back office computer and receive authorization data from the back office computer, the authorization data indicating that the user is authorized to use the EVCS or EVSE.

The foregoing and other objects, features, and advantages of the disclosed technology will become more apparent from the following detailed description, which proceeds with reference to the accompanying figures.

DETAILED DESCRIPTION

I. General Considerations

Disclosed below are representative embodiments of methods, apparatus, and systems for using and operating electric vehicle charging stations ("EVCSs") or electric vehicle supply equipment ("EVSE") with mobile device payment technology. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "monitor" to describe the disclosed methods. These terms are high-level abstractions of the actual operations that are performed. The actual operations that correspond to these terms may vary depending on the particular implementation and are readily discernible by one of ordinary skill in the art. Furthermore, as used herein, the term "and/or" means any one item or combination of items in the phrase.

Any of the disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer, a computer processor embedded in the EVCS/EVSE, or a computer processor of a mobile device). Any of the intermediate or final data created and used during implementation of the disclosed methods or systems can also be stored on one or more computer-readable media (e.g., non-transitory computer-readable media).

For clarity, only certain selected aspects of the software-based embodiments are described. Other details that are well known in the art are omitted. For example, it should be understood that the software-based embodiments are not limited to any specific computer language or program. For instance, embodiments of the disclosed technology can be implemented by software written in C++, C#, Objective C, Java, Perl, JavaScript, Adobe Flash, or any other suitable programming language. Likewise, embodiments of the disclosed technology are not limited to any particular computer or type of hardware. Details of suitable computers and hardware are well known and need not be set forth in detail in this disclosure.

Furthermore, any of the software-based embodiments (comprising, for example, computer-executable instructions stored on a non-transitory computer-readable medium) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented using specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")) specially designed to implement any of the disclosed methods. The integrated circuit or specialized computing hardware can be embedded in or directly coupled to an EVCS/EVSE or device that is configured to interact with the EVCS/EVSE.

Figure 5:
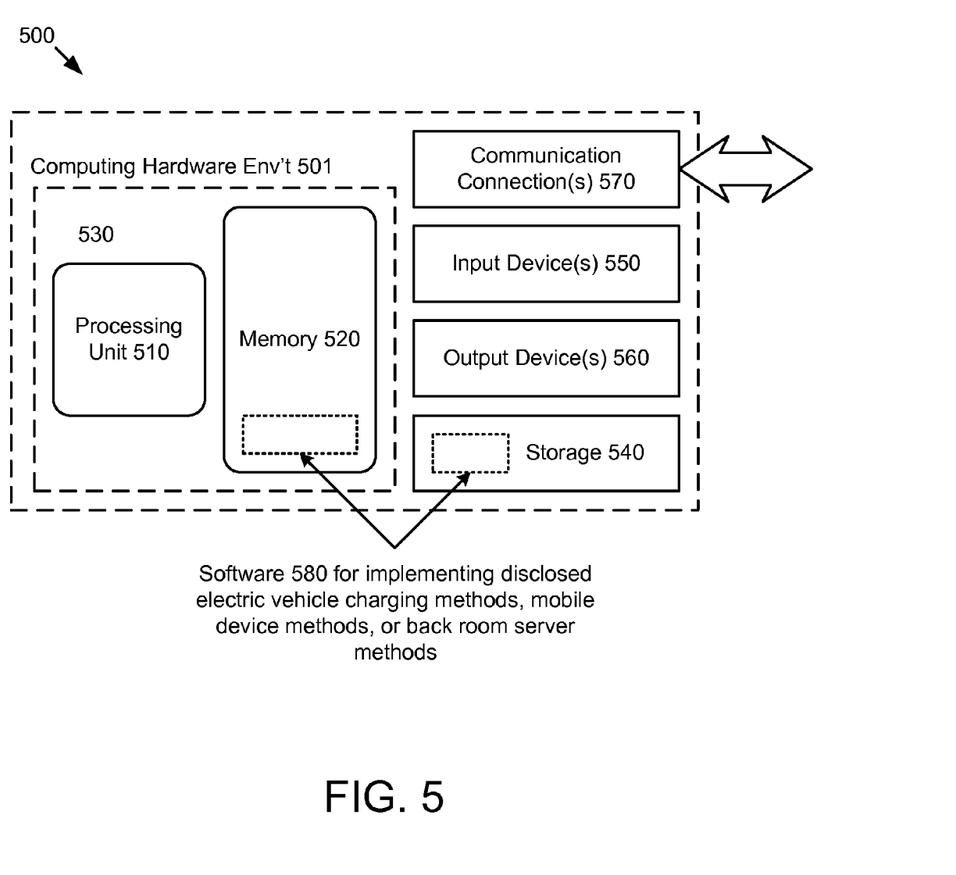
FIG. 5 is a schematic block diagram of an exemplary computing environment for implementing embodiments of the disclosed technology.

FIG. 5 is a schematic block diagram 500 that illustrates a generalized example of a suitable computing hardware environment 501 in which embodiments of the disclosed technology can be implemented. The computing hardware environment 501 is not intended to suggest any limitation as to the scope of use or functionality of the disclosed technology, as the technology can be implemented in diverse general-purpose or special-purpose computing environments.

With reference to FIG. 5, the computing hardware environment 501 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The memory 520 may be volatile memory (e.g., registers, cache, RAM, DRAM, SRAM), non-volatile memory (e.g., ROM, EEPROM, flash memory), or some combination of the two. The memory 520 can store software 580 for implementing one or more of the described techniques for operating or using the disclosed electric vehicle charging systems. For example, the memory 520 can store software 580 for implementing any of the disclosed methods and their accompanying user interfaces.

The computing hardware environment can have additional features. For example, the computing hardware environment 501 includes storage 540, one or more input devices 550, one or more output devices 560, and one or more communication connections 570. An interconnection mechanism (not shown) such as a bus, controller, or network interconnects the components of the computing hardware environment 501. Typically, operating system software (not shown) provides an operating environment for other software executing in the computing hardware environment 501, and coordinates activities of the components of the computing hardware environment 501.

Storage 540 is a type non-volatile memory and can be removable or non-removable. The storage 540 includes, for instance, magnetic disks (e.g., hard drives), magnetic tapes or cassettes, optical storage media (e.g., CD-ROMs or DVDs), or any other tangible non-transitory storage medium which can be used to store information and which can be accessed within or by the computing hardware environment 501. The storage 540 can store the software 580 for implementing any of the described techniques, systems, or environments.

The input device(s) 550 can be a touch input device such as a keyboard, mouse, touch screen, pen, trackball, a voice input device, a scanning device, or another device that provides input to the computing environment 501. The output device(s) 560 can be a display, touch screen, printer, speaker, or another device that provides output from the computing environment 501.

The communication connection(s) 570 enable communication over a communication medium to another computing entity. The communication medium conveys information such as computer-executable instructions, any of the intermediate or final messages or data used in implementing embodiments of the disclosed technology, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier. For example, the communication connection(s) 570 can communicate with another computing entity over a wired or wireless network (e.g., the Internet, a wide-area network, a local-area network, a Wi-Fi network, a client-server network, a wireless mesh network, or other such network or any combination thereof).

Many of the methods, systems, and interfaces disclosed herein can be described in the general context of computer-executable instructions stored on one or more computer-readable media. Computer-readable media are any available media that can be accessed within or by a computing environment. By way of example, and not limitation, with the computing hardware environment 501, computer-readable media include tangible non-transitory computer-readable media such as memory 520 and storage 540. The various methods, systems, and interfaces disclosed herein can also be described in the general context of computer-executable instructions, such as those included in program modules, being executed in a computing environment on a target real or virtual processor. Generally, program modules include routines, programs, libraries, objects, classes, components, data structures, and the like that perform particular tasks or implement particular abstract data types. The functionality of the program modules may be combined or split between program modules as desired in various embodiments. Computer-executable instructions for program modules may be executed within a local or distributed computing environment.

II. Exemplary Embodiments of the Disclosed Technology

Figure 1:
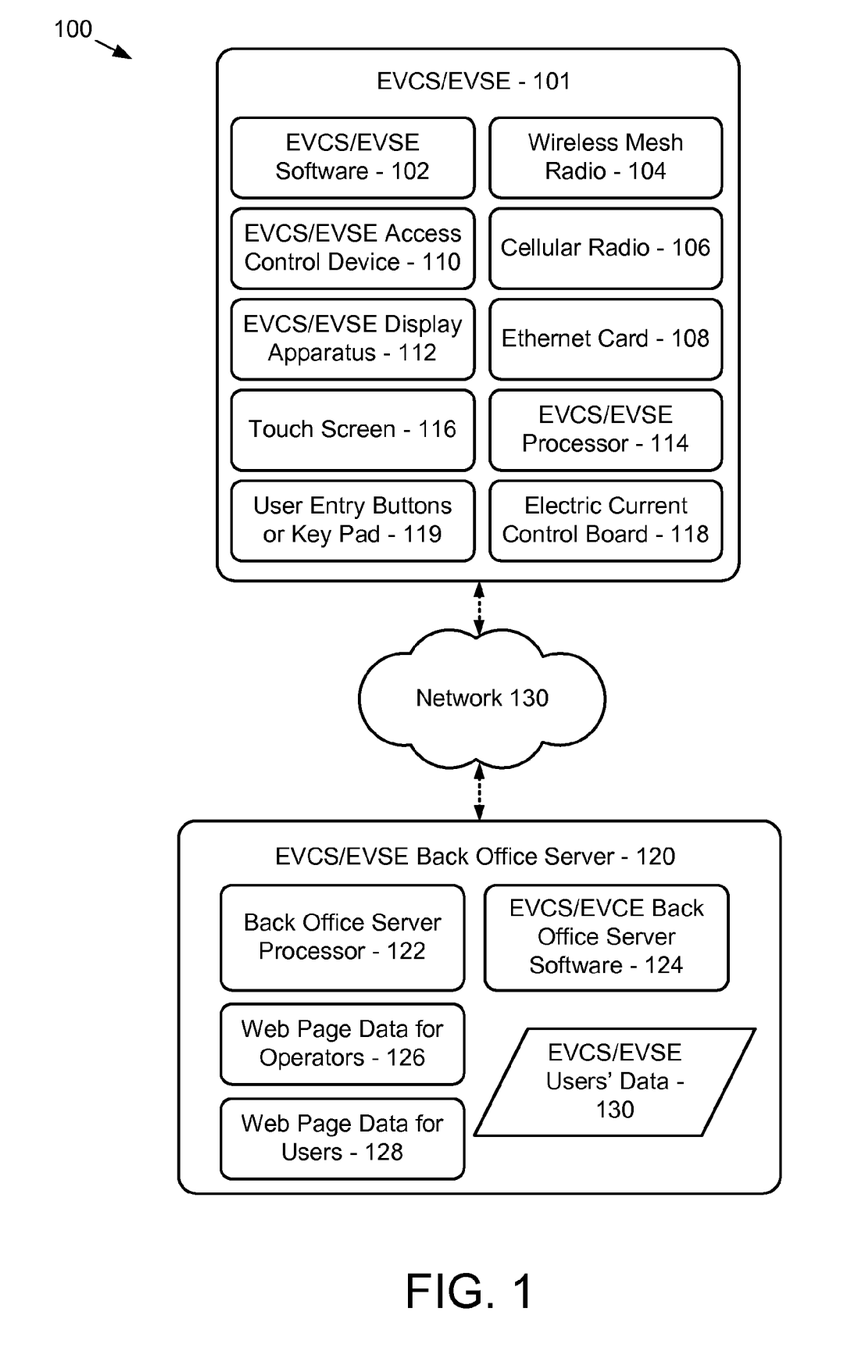
FIG. 1 is a schematic block diagram illustrating an exemplary electric vehicle charging system with a display device coupled to a back office serve via a network.

FIG. 1 is a schematic block diagram 100 illustrating an EVCS/EVSE computing hardware environment 101 for implementing embodiments of the disclosed technology. In particular, FIG. 1 illustrates an exemplary computing hardware environment 101 for an EVCS/EVSE and an exemplary computing hardware environment 120 for an EVCS/EVSE back office server. The EVCS/EVSE environment 101 is more specialized than computing hardware environment 501 but should not be construed as limiting the types of hardware that can be used to implement the disclosed technology. Furthermore, the EVCS/EVSE environment 101 and the exemplary computing hardware environment 120 for the EVCS/EVSE back office server can include any of the components described above with respect to the general computing hardware environment 501.

The EVCS/EVSE computing hardware environment 101 includes software 102, which comprises computer-executable instructions stored on non-transitory computer-readable media (e.g., any one or more of the non-transitory computer-readable media described above). When executed, the software can be used to implement the functionality of the EVCS/EVSE, which is described in more detail below. The EVCS/EVSE computing hardware environment 101 further comprises an EVCS/EVSE processor 114 for executing the software 102. Suitable processors and associated parts can be obtained, for example, from Parvus Corporation. In the illustrated embodiment, the EVCS/EVSE processor 114 is interconnected to an electric current control board 118. The electric current control board 118, in turn, is connected to the cables and electrical connectors of the EVCS/EVSE that provide the electrical coupling to the one or more electric vehicles (e.g., using a SAE J1772 connector, IEC 62196 electrical connector, or other such electric vehicle connector). Suitable electric current control boards and associated parts can be obtained, for example, from Texas Instruments, Riley Corp, and National Control Devices. In certain exemplary embodiments, the EVCS/EVSE software 102 is used to implement a process in which commands and data are exchanged to control the flow of electrical current between one or more electric vehicles plugged into the EVCS/EVSE (e.g., the EVCS/EVSE 240 shown in FIG. 2) and the power grid (e.g., the power grid 270 shown in FIG. 2). The EVCS/EVSE computing hardware environment 101 can also include one or more of a wireless mesh radio 104, a cellular radio 106 and/or an Ethernet card 108 (or other network adapter) to provide the environment 101 with a number of wired and wireless interface capabilities for exchanging data with, for example, an EVCS/EVSE back office server 120. Suitable wireless mesh radios and associated parts can be obtained, for example, from Digi International. Suitable cellular radios and associated parts can be obtained, for example, from Telit Communications Plc. In the illustrated embodiment, the EVCS/EVSE processor 114 includes Ethernet functionality but can include other network functionality. The EVCS/EVSE computing hardware environment 101 also includes an access control device 110, such as a magnetic card reader or radio frequency identity ("RFID") reader, and a display device 112, such as an LCD, LED, or plasma screen with a touch screen interface 116. The optional touch screen interface can be a resistive touch screen, a surface acoustic wave touch screen, a capacitive touch screen, infrared touch screen, optical imaging touch screen, dispersive signal touch screen, acoustic pulse recognition touch screen, or any other touch screen that enables position detection of user interaction with the display device. Another possible option to facilitate user interaction is using a display device without a touch screen interface but with a set of user entry buttons or a keypad 119. Although the exemplary EVCS/EVSE computing hardware environment 101 is shown as including both a touch screen 116 and a set of user entry buttons or keypad 119, the touch screen 116 can be implemented alone or the set of user entry button or keypad 119 can be implemented alone. Suitable magnetic card readers and associated parts can be obtained, for example, from ID Tech. Suitable display devices and touch screen interfaces can be obtained, for example, from Logic Supply. As more fully described below, the touch screen interface 116 can be used to facilitate the charging of the electric vehicle and the proper billing (or crediting) for the electricity used (or supplied) by the electric vehicle coupled to the EVCS/EVSE. Although the exemplary EVCS/EVSE computing hardware environment 101 is shown as including an access control device 110 such as a magnetic card reader or RFID device, the disclosed technology is meant to provide the EVSE user with an alternative to this device as a method of access control and payment. As shown in FIG. 1, the EVCS/EVSE computing hardware environment 101 is coupled to the EVCS/EVSE back office server environment 120 via the network 130 (e.g., the Internet, a wide-area network, a local-area network, a Wi-Fi network, a client-server network, a wireless mesh network, or other such network or any combination thereof). In particular embodiments, the back office server environment 120 is implemented as part of a cloud-based back office server.

In operation, the EVCS/EVSE computing hardware environment 100 can create a number of data packets or messages that are transmitted to the EVCS/EVSE back office server environment 102 via a network 130. The EVCS/EVSE back office server environment 102 can receive these packets or messages and can also create data packets or messages that will be transmitted to the EVCS/EVSE computing hardware environment 100 via the network 130. During times of high usage of the installed EVCSs/EVSE or to facilitate integration of the installed EVCSs/EVSE into a "smart" electric power grid for purposes of allowing the electric power grid operators to control the charging of connected electric vehicles (e.g., to limit the charging of connected electric vehicles during peak electricity usage times or times of high electrical prices), many messages can be sent between a number of EVCSs/EVSE and one or more EVCS/EVSE back office servers. Both the EVCS/EVSE computing hardware environment 100 and the EVCS/EVSE back office server environment 120 can therefore include data packet or message control functionality that will allow for the prioritization of data packets or messages. An exemplary method and system for communicating between the EVCS/EVSE computing hardware environment 100 and the back office server environment 120 is described below in connection with FIG. 6.

Returning to FIG. 1, the back office server environment 120 can be implemented using a wide variety of computers and/or servers (e.g., a suitable commercially available server). In FIG. 1, the back office server environment 120 includes back office server software 124, which can comprise computer-executable instructions stored on non-transitory computer-readable media (e.g., any one or more of the non-transitory computer-readable media described above). When executed, the software can be used to implement the functionality of the back office server, which is described in more detail below. The EVCS/EVSE back office server 120 further comprises a back office server processor 122 for executing software 124. Also shown in FIG. 1 is EVSC/EVSE user data 130. The EVSC/EVSE user data 130 can comprise data stored on non-transitory computer-readable media that is related to users of the EVCS/EVSE. For example, the data can include data about a user's identification, address, account credit balance, usage history, vehicle, and/or other such user data.

In the illustrated embodiment, the EVCS/EVSE back office server 120 also includes data 126 for implementing one or more web pages for an EVCS/EVSE operator. The web page data 126 can comprise data stored on non-transitory computer-readable media that is used to render or otherwise implement one or more web pages for display to an EVCS/EVSE operator. The web pages can be displayed, for example, using a suitable internet browser or media player implemented at a computer operated by the EVCS/EVSE operator and coupled to the back office server 120 via a network (e.g., the Internet, a wide-area network, a local-area network, a Wi-Fi network, a client-server network, a wireless mesh network, or other such network or any combination thereof). The web page data can be in any format or language suitable for implementing web pages (e.g., HTML, Flash, Java, and the like). In other embodiments, the data to be displayed to the EVCS/EVSE operator is not stored as web page data, but as data usable via a non-web-based user interface (e.g., a dedicated program that directly interfaces with the back office server 120).

The EVCS/EVSE back office server 120 can also include data 128 for implementing one or more web pages for an EVCS/EVSE user. The web page data 128 can comprise data stored on non-transitory computer-readable media that is used to render or otherwise implement one or more web pages for display to an EVCS/EVSE user. The web pages can be displayed, for example, using a suitable internet browser or media player implemented at a computer operated by the EVCS/EVSE user and coupled to the back office server 120 via a network (e.g., the Internet, a wide-area network, a local-area network, a Wi-Fi network, a client-server network, a wireless mesh network, or other such network or any combination thereof). The web page data can be in any format or language suitable for implementing web pages (e.g., HTML, Flash, Java, and the like). In other embodiments, the data to be displayed to the EVCS/EVSE user is not stored as web page data, but as data usable via a non-web-based user interface (e.g., a dedicated program that directly interfaces with the back office server 120). In certain embodiments, the web page data 128 is data for implementing web pages that show the user information about the state of the user's account, including amount of credit balance and purchase history. For example, the web page data can include data for implementing a log-in screen, through which the user provide authentication information indicating that the user is a member of a group authorized to use an EVCS/EVSE in a network of EVCSs/EVSE controlled by the back EVCS/EVSE back office server 120, and a data for implementing an account status screen, through which the user is presented a graphical or numerical indication of the state of the user's account. The EVCS/EVCE back office server software 124 can include code that receives information about the identity of the user at the log-in screen, matches the identity to an EVCS user database and causes the display of the information about the state of the user's account via one or more web pages displayed to the user. The information about the user's account can comprise, for instance, the current credit balance in the account, the method of payment (i.e. credit/debit card or bank account information) to be used for electric charging payment purposes, and a record of past charges against this account.

Figure 2:
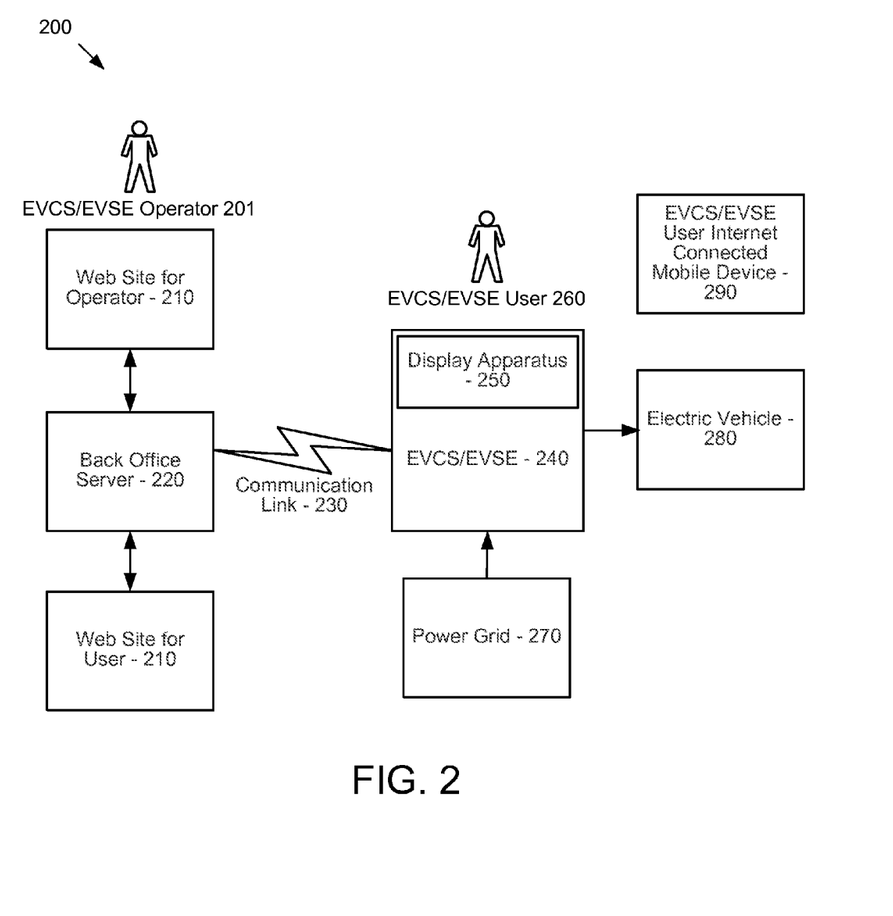
FIG. 2 is a schematic block diagram illustrating an exemplary EVCS/EVSE system and the users of the exemplary system.

FIG. 2 is a schematic block diagram 200 illustrating an exemplary EVCS/EVSE system and the users of the exemplary system. In FIG. 2, a user 260 interfaces with an EVCS/EVSE 240 using a display apparatus 250. The display apparatus 250 allows the user to view operating instructions and/or to make entries of information. As noted above, the functionality of the display apparatus 250 can be implemented by executing appropriate EVCS/EVSE software stored at the EVCS/EVSE (e.g., EVCS/EVSE software 102). The EVCS/EVSE 240 uses a communication device (e.g., one or more of the wireless mesh radio 104, cellular radio 106, or Ethernet card 108 shown in FIG. 1) to establish a communication link 230 with a back office server 220. The functionality of the back office server 220 can be implemented by executing appropriate back office software stored at the back office server 220 (e.g., back office server software 124). The EVCS/EVSE 240 can also use the communication device to transmit information entered by the user 260 to the back office server 220. This information can comprise, for example, entries made by the user via the display apparatus 250.

In embodiments of the disclosed technology, the display apparatus 250 displays information that can be used by a mobile device operated by the user. For example, in certain embodiments, the display apparatus 250 is used to display a quick reference ("QR") code, a barcode (linear or two-dimensional), or an alpha-numeric code that can then be scanned with an Internet-connected mobile device 290 operated by the EVCS/EVSE user 260. Furthermore, and as more fully explained below with respect to FIG. 6, the mobile device 290 can be configured to communicate with the back office server 220 (e.g., via a cellular or other wireless network link, shown as network communication link 616).

Figure 6:
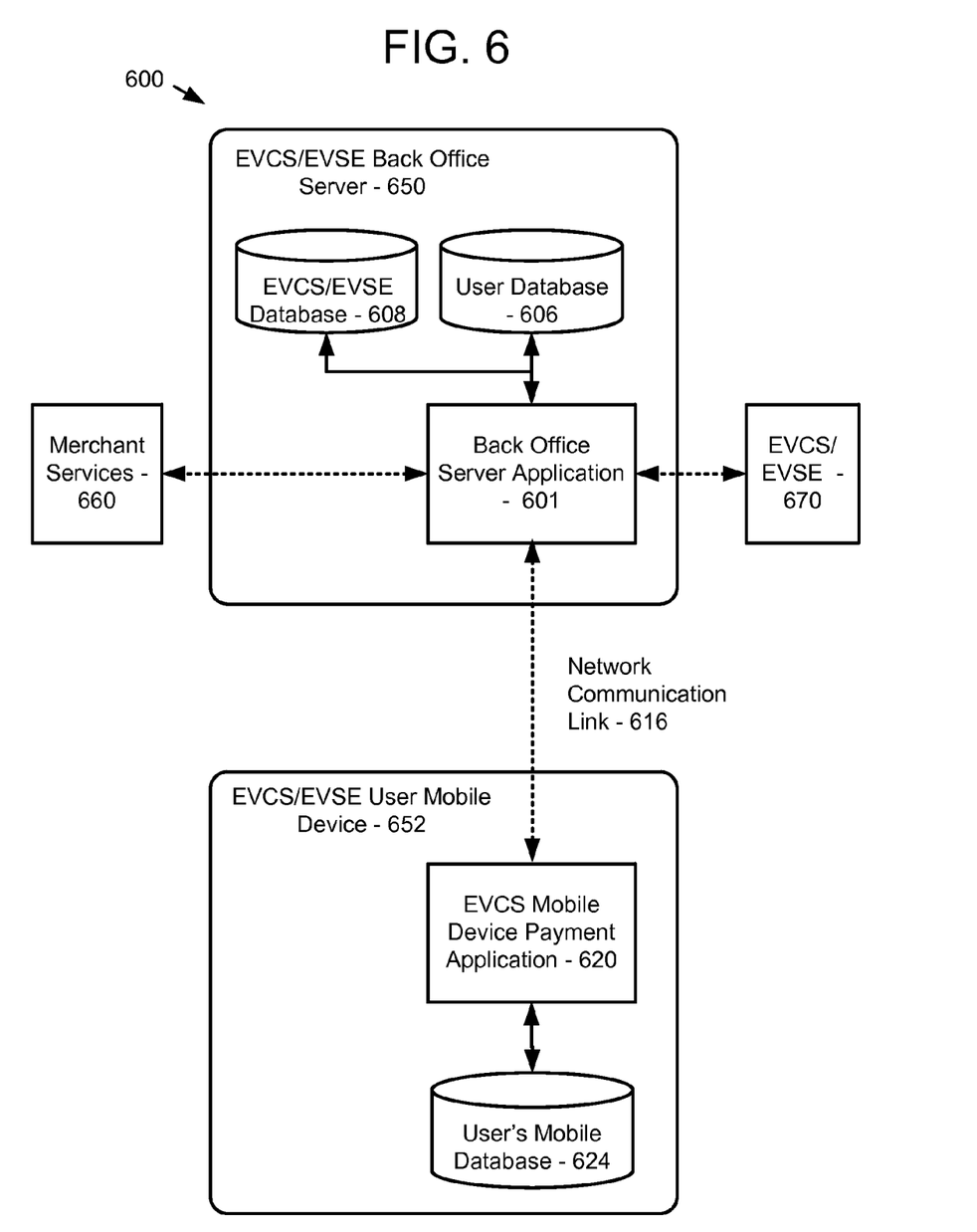
FIG. 6 is a schematic block diagram of an exemplary network communication environment for implementing embodiments of the disclosed technology.

FIG. 6 is a schematic block diagram illustrating components of an exemplary mobile device 652 (which can correspond to the mobile device 290 in FIG. 2) and a EVCS back office server 650 (which can correspond to the back office server 220 in FIG. 2) with which the mobile device 652 can communicate. In the illustrated embodiment, the mobile device 652 includes an EVCS Mobile Device Payment Application ("MPA") 620 configured to communicate with a back office server application 601 (which can be part of the software 124 shown in FIG. 1) running on the back office server 650. The MPA 620 accesses the user's database 624 that is stored locally on the mobile device 652 (although in other embodiments, the database is stored remotely, such as in a cloud-based server). In the illustrated embodiment, the user's database 624 is a local copy of the user's account data that is stored on the back office server. The MPA 620 and the back office server application 601 can periodically synchronize these two databases. The MPA 620 can implement a "scanning" operation on the mobile device that scans the QR code, barcode, or alpha-numeric code that is shown on the display apparatus 250 (e.g., using the mobile device's camera (such as the mobile device's image sensor) and suitable software for capturing an image of the code and decoding the code) and transmits the data embedded in this code along with the user's identity information from the user's mobile database 624 to the back office server application 601 via the network communication link 616. The data embedded in the code can include one or more of a unique identification of the EVSE 670 (such as EVSE 240 in FIG. 2) that the user is using to charge their electric vehicle, the charging port that the user is using (if there is more than one charging port on the EVSE 670), the start date/time of the charging session (e.g., the date and time or substantially the date and time of when the charging session data was created, potentially within some acceptable level of accuracy (for instance, ±1 minute or less)), and other information that will be used by the back office server application 601 to properly determine the costs to bill the user for this charging session.

Once this charging session data and the user identification information is received by the back office server 650, the ability of the user to access the EVCS/EVSE can be determined (e.g., using stored users' data from user database 606 (which corresponds to data 130 shown in FIG. 1) either directly by the back office server application or by interfacing with a remote merchant services 660 to authorize the user's payment. If the user's payment is authorized or if they are otherwise authorized to access the EVSE, the back office server 650 transmits authorization information to the EVCS/EVSE 670 via a communication link (e.g., via the communication link 230) and the EVCS/EVSE will deliver electric charging to the electric vehicle (e.g. EV 280). In certain embodiments, the back office server 650 will also send the authorization information to the user's mobile device 652 so that the MPA 620 can update the user's mobile database 624 and display a message to the user that the charging session is authorized.

The disclosed technology supports a variety of payment methodologies for EVCS/EVSE usage. For example, if the particular EVCS/EVSE that the user has chosen has a fixed cost per charging session, the back office server application 601 will debit the user's account for the fixed amount or obtain authorization for the fixed amount from merchant services 660. If the EVCS/EVSE chosen charges the user by the unit of electricity consumed (e.g., kilowatt hour), the back office server application 601 can determine how many units of electricity can be purchased by the user given their current account credit balance and send that information to the EVCS/EVSE 670. The EVCS/EVSE 670 can then end the charging session when the user ends it, or when it has delivered the maximum units of electricity that the user was able to purchase. The maximum number of units the user can purchase can also be displayed to the user by the MPA 620 and the user can use the MPA to increase the credit balance in their account, or purchase more units of electricity, if desired. In yet another payment methodology, if the EVCS/EVSE chosen charges the user by the amount of time that the EV is connected to the EVCS/EVSE and/or is receiving an electrical charge from the EVCS/EVSE, the disclosed technology can support that methodology in a manner similar to the previous scenario with the unit of electricity replaced by the amount of time that the EV is connected to the EVCS/EVSE and/or is receiving a charge from the EVCS/EVSE.

In particular embodiments, the back office server 220 in FIG. 2 is also configured to operate a website 212 for exchanging information relative to the EVSE/EVSE with the EVCS/EVSE user 260. The information can comprise, for example, the current status of the user's account, account records for the user, or other such information. The user 260 can use this website to increase the credit balance on their account and manage payment sources (e.g., link the charging station account to a bank account or credit/debit card).

Figure 3:
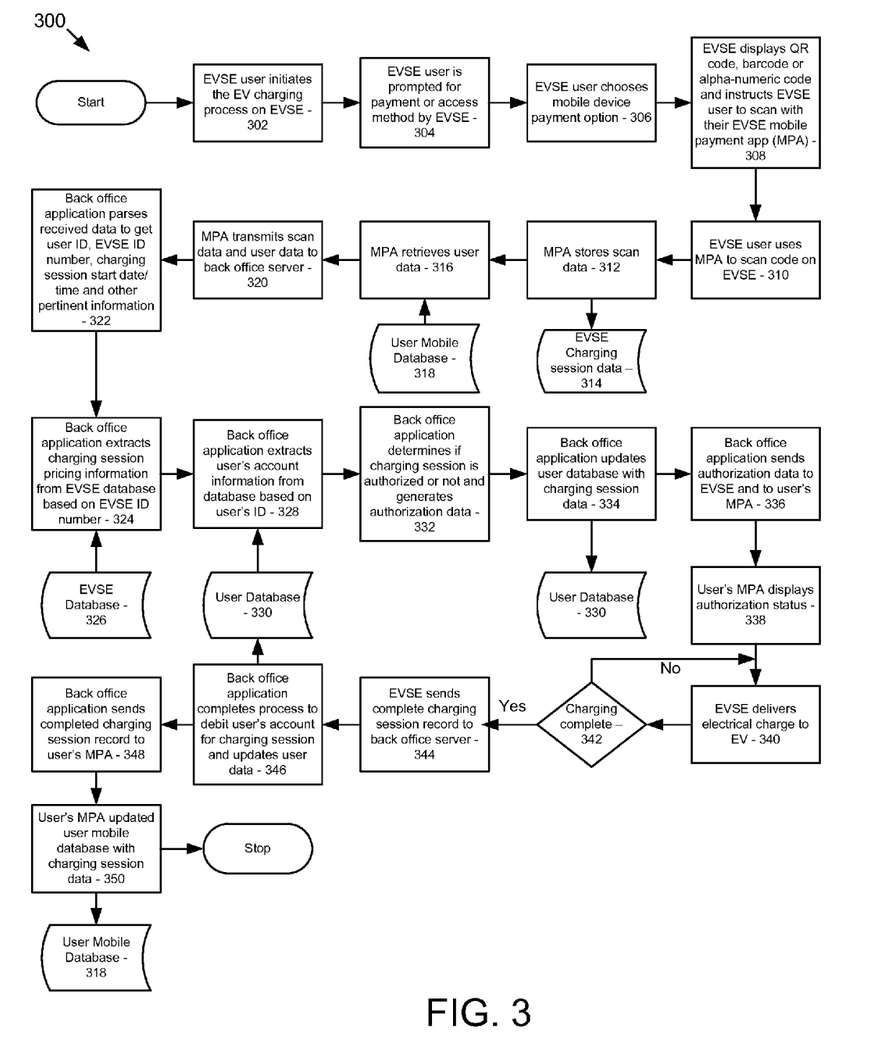
FIG. 3 is a flowchart of an exemplary method for using a mobile device to control access to and payment for the use of an EVCS/EVSE according to an embodiment of the disclosed technology.

FIG. 3 is a flow chart 300 showing an exemplary process for authorizing a user and collecting payment for use of an EVCS/EVSE using the disclosed technology. As noted above, the functionality shown in FIG. 3 can be implemented by computing hardware executing computer-executable instructions. The various procedures shown in FIG. 3 should not be construed as limiting, as any one or more of the procedures can be performed alone or in various other combinations and subcombinations in accordance with the disclosed technology.

Figure 4:
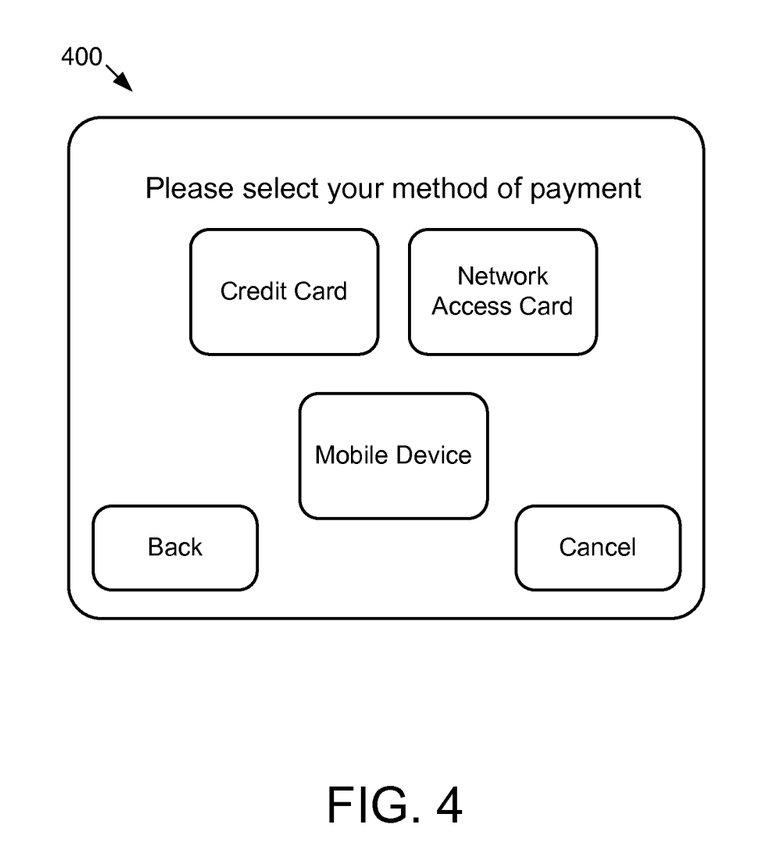
FIG. 4 illustrates an exemplary EVCS/EVSE screen showing a possible screen for identifying which payment method the EVCS/EVSE user wishes to use.

In the illustrated embodiment, the user initiates an EV charging session on the EVCS/EVSE by plugging in their EV and/or interacting with the EVCS/EVSE user interface (process block 302). The EVCS/EVSE will then prompt the user to select their payment method of access method (process block 304). FIG. 4 shows an example EVCS/EVSE display screen 400 in which the user is prompted to select their method of payment. It should be noted that the term "access method" is mentioned in addition to payment method because there may be usage methodologies in which an EVCS/EVSE is free to use (no payment required to use it) but its usage is restricted to certain users, or restricted to certain types of users at certain days, times of the day or other conditions.

Figure 7:
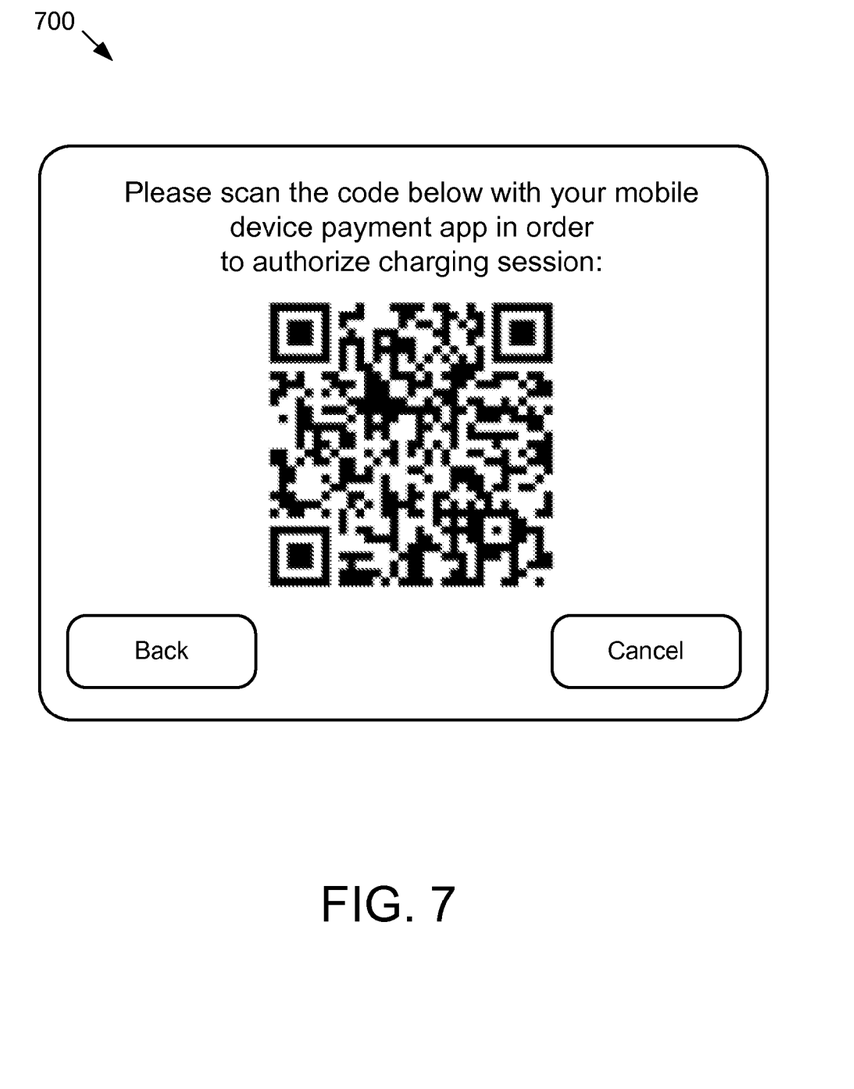
FIG. 7 illustrates an exemplary EVCS/EVSE screen showing a possible screen for presenting the user with a QR code to be scanned by the user in order to authorize a charging session.

When the user selects the mobile device payment option (process block 306), the EVCS/EVSE display apparatus displays a QR code, barcode, or alphanumeric code and instructs the user to use their MPA to scan this code (process block 308). The EVCS/EVSE will generate this code based on the EVCS/EVSE's unique identification (ID) number, the charging port that the user has selected to use (if there is more than one port on the EVCS/EVSE), the date/time of the charging session start (e.g., the date and time or substantially the date and time of when the charging session data was created, potentially within some acceptable level of accuracy (for instance, ±1 minute or less)), a unique session ID number and/or other data that may be necessary to uniquely identify each charging session for proper billing. FIG. 7 shows an example EVCS/EVSE display screen 700 in which the user is prompted to scan a QR code encoding the EVCS/EVSE's unique identification (ID) number, the charging port that the user has selected to use (if there is more than one port on the EVCS/EVSE), the date/time of the charging session start (e.g., the date and time or substantially the date and time of when the charging session data was created, potentially within some acceptable level of accuracy (for instance, ±1 minute or less)), and a unique session ID number.

The user will login to the MPA on their mobile device and use the MPA to scan the code displayed by the EVCS/EVSE (process block 310). The MPA will store the pertinent charging session data contained in the scanned code (process blocks 312 & 314) and retrieve the user's account data from a mobile user database stored on the mobile device (by the MPA) (process blocks 316 & 318). The MPA will then build a message that includes the user's identification data and the charging session data from the scanned code and send this message to the back office application running on the back office server (process block 320). The messaging between the EVCS/EVSE and the back office application can take place as described in U.S. patent application Ser. No. 13/033,179, entitled "ELECTRIC VEHICLE CHARGING STATIONS WITH TOUCH SCREEN USER INTERFACE" and filed on Feb. 23, 2011, the entirety of which is hereby incorporated herein by reference.

Once the back office application receives the message from the EVCS/EVSE, it will parse this message to retrieve the user's unique ID number, the EVCS/EVSE's unique ID number, the charging session start date/time, session ID and/or other information that may be included in the message to ensure the correct payment for the charging session and/or correct control of access to the EVCS/EVSE (process block 322). The back office server has a database of each installed EVCS/EVSE (608 in FIG. 6) and the back office application will use the EVCS/EVSE's unique ID number from the message to retrieve the charging station's access control policies, pricing information, and/or any other data that may be necessary to ensure correct control of access to the EVCS/EVSE and/or correct pricing of the charging session (process block 324 & 326). The back office application will also retrieve the user's account information from the user database based on the user's unique ID number (process block 328 & 330). Based on the EVCS/EVSE's access control profile, its pricing data and/or the user's account data, the back office application will determine if the user is authorized to use this particular EVCS/EVSE and/or if they have sufficient funds associated with their account to pay for an EV charging session on this EVCS/EVSE (process block 332). This determination may include, but is not limited to, activities such as debiting the user's account credit balance for a fixed amount if the charging sessions are fixed price, determining the amount of time or units of electricity that the user can purchase at this particular EVCS/EVSE based on their available account credit balance and/or interfacing with a third-party merchant services or other credit/debit card processing service to enter a charge on their account in a fixed amount or place a credit hold for an amount sufficient to cover the charging session. If the user has an insufficient credit balance in their account, the back office application will also allow for them to set account preferences which instruct the back office application to debit their credit card for a fixed amount when their account's credit balance falls below a minimum level, thereby ensuring that as long as a valid credit/debit card is associated with the account, there will always be sufficient funds in the account to cover EV charging sessions.

Once the back office application has determined whether the charging session is authorized, it will construct a message with the authorization data and update the user's database with this session's authorization data (process blocks 332 & 334). The back office application will then transmit this authorization message to both the EVCS/EVSE and the MPA on the user's mobile device (process block 336). When the user's MPA receives the authorization message, it will display the authorization result and other pertinent information to the user (process block 338). The EVSE will continue to charge the EV once it receives the authorization data and the session is authorized (process block 340). While it is not shown in FIG. 3, if the charging session was not authorized, the EVCS/EVSE will discontinue charging the EV and it is up to the user to return to the EVCS/EVSE and initiate another charging session with an alternative payment and/or access control method.

Once the charging session is completed (for example, by the user disconnecting their EV from the EVCS/EVSE), the EVSE will construct a message with the completed charging session's data (e.g., session ID, session end date/time, energy consumption, etc.) and send this message to the back office application (process blocks 342 & 344). Once the back office application receives this session data, it will use it to compute the final cost of the charging session (if necessary) and update the user's account data with this session data and final costs (process block 346) (e.g., by debiting the amount from the user's account, creating a charging record for later billing, or by causing a financial transaction for paying the cost to be initiated (e.g., through a credit card vendor or bank). The back office application will then construct a message containing the final session data and send it to the MPA on the user's mobile device (process block 348) and/or the EVCS/EVSE. Once the user's MPA receives the final session data, it will update the user's mobile data with this information, completing the process (process block 350).

III. Further Embodiments

Having described and illustrated the principles of the disclosed technology in the detailed description and accompanying drawings, it will be recognized that the various embodiments can be modified in arrangement and detail without departing from such principles. Furthermore, any features or aspects of the disclosed embodiments can be used in various combinations and subcombinations with one another.

A further embodiment of the disclosed technology could be applied in the field of parking payment. A parking payment kiosk including a display apparatus could be used in a similar manner to display a readable QR code, barcode, or alphanumeric code. This code can be read by a mobile device application that sends the data encoded in this code along with the user credentials to a back office computer for authorization and payment purposes. The back office computer could send the authorization data to the parking payment kiosk for display to the user, printing of a receipt and/or use by parking enforcement personnel.

A further embodiment of the disclosed technology could be applied to the dispensing of other types of vehicle fuel, such as a fueling station pump (for gasoline, biofuels or compressed natural gas for example). A fueling pump including a display apparatus could be used in a similar manner to display a readable QR code, barcode, or alphanumeric code. This code can be read by a mobile device application that sends the data encoded in this code along with the user credentials to a back office computer for authorization and payment purposes. The back office computer could send the authorization data to the fueling pump for display to the user and to signal the fueling pump to begin dispensing the fuel.

Furthermore, it is to be understood that any of the features and embodiments described herein can be used in combination with any of the features and embodiments described in U.S. Provisional Application No. 61/307,318, filed on Feb. 23, 2010, and entitled "ELECTRIC VEHICLE CHARGING STATION WITH TOUCH SCREEN USER INTERFACE"; U.S. Provisional Application No. 61/409,108, filed on Nov. 1, 2010, and entitled "ELECTRIC VEHICLE CHARGING STATION WITH TOUCH SCREEN USER INTERFACE"; U.S. Provisional Application No. 61/307,377, filed on Feb. 23, 2010, and entitled "ELECTRIC VEHICLE CHARGING STATION ADVERTISING SYSTEM"; U.S. Provisional Application No. 61/353,944, filed on Jun. 11, 2010, and entitled "ELECTRIC VEHICLE CHARGING STATION ADVERTISING SYSTEM"; U.S. Provisional Application No. 61/317,181, filed on Mar. 24, 2010, and entitled "ELECTRIC VEHICLE CHARGING STATION PARKING METER SYSTEM"; U.S. Nonprovisional application Ser. No. 12/954,209, filed on Nov. 24, 2010, and entitled "ELECTRIC VEHICLE CHARGING STATION ADVERTISING SYSTEMS"; U.S. Nonprovisional application Ser. No. 13/033,179, filed on Feb. 23, 2011, and entitled "ELECTRIC VEHICLE CHARGING STATIONS WITH TOUCH SCREEN USER INTERFACE"; U.S. Nonprovisional application Ser. No. 13/070,389, filed on Mar. 23, 2011, and entitled "ELECTRIC VEHICLE CHARGING STATION PARKING METER SYSTEMS"; U.S. Provisional Application No. 61/719,483, filed on Oct. 28, 2012, and entitled "SYSTEM FOR COMBINING PAYMENT FOR ELECTRIC VEHICLE CHARGING AND PARKING"; and U.S. Provisional Application No. 61/728,134, filed on Nov. 19, 2012, and entitled "RESERVATION SYSTEMS FOR ELECTRIC VEHICLE CHARGING STATIONS", all of which are hereby incorporated herein by reference.

In view of the many possible embodiments to which the principles of the disclosed invention may be applied, it should be recognized that the illustrated embodiments are only preferred examples of the invention and should not be taken as limiting the scope of the invention.

What is claimed is:
1. A method for charging an electric vehicle at an electric vehicle charging station ("EVCS") or electric vehicle supply equipment ("EVSE") through use of a mobile device operated by a user, comprising:
    executing, by computing hardware in the mobile device, a mobile device application on the mobile device configured to:
      a) authenticate the user to the mobile device application;
      b) read encoded charging session data that is being displayed on a display screen of an electronic display device of the EVCS or EVSE using an image sensor on the mobile device, wherein the encoded charging session data being displayed on the display screen of the electronic display device of the EVCS or EVSE includes encoded data for a unique identification of the EVCS or EVSE, a unique charging session identification number, and a charging session start date and time;

c) decode the encoded charging session data, the decoded charging session data including the unique identification of the EVCS or EVSE, the unique charging session identification number, and the charging session start date and time;
d) combine the unique identification of the EVCS or EVSE and the unique charging session identification number and the charging session start date and time with user identification data identifying the user of the mobile device application to form a dataset;
e) transmit the dataset to a remote server; and
f) receive a response from the remote server, the response indicating that a vehicle charging operation for the user is authorized at the EVCS or EVSE;

receiving, by the EVCS or EVSE, an indication from the remote server that the vehicle charging operation is authorized at the EVCS or EVSE; and performing, by the EVCS or EVSE, the vehicle charging operation for an electric vehicle at the EVCS or EVSE in response to the indication.

2. The method of claim 1, wherein the encoded charging session data is encoded in a QR code, barcode, or alphanumeric code.

3. The method of claim 1, wherein the encoded charging session data is displayed as a result of the user making a selection via a touch screen interface at the EVCS or EVSE to use the mobile device application.

4. The method of claim 1, further comprising:
by computing hardware at the remote server:
  receiving the dataset transmitted from the mobile device;
  determining whether to authorize a charging operation at the charging station for the user, wherein the determining is based at least in part on the received data; and
  causing the EVCS or EVSE to charge the electric vehicle at the EVCS or EVSE by transmitting to the EVCS or EVSE an indication that the charging operation is authorized.

5. The method of claim 1, further comprising:
by the computing hardware at the remote server:
  receiving completed charging session data from the charging station; and
  computing a cost for the charging session based at least in part on the received completed charging session data.

6. The method of claim 1, wherein the completed charging session data comprises one or more of the unique charging session identification number, a charging session end date and time, or an indication of the energy consumed during the charging session.

7. The method of claim 1, wherein the step to authenticate is performed by receiving a login identification and a password from the user.

8. A system for performing an electric vehicle charging operation through use of a mobile device, comprising:
an electric vehicle charging station ("EVCS") or electric vehicle supply equipment ("EVSE") comprising:
  an electronic display device having an electronic display screen;
  an electric current control board; and
  one or more electrical connectors connected to the electric current control board and configured to provide an electrical coupling to an electric vehicle,
  wherein the EVCS or EVSE is programmed and configured to display encoded charging session data on the display screen of the electronic display device, the encoded charging session data including encoded data for a unique identification of the EVCS or EVSE, a unique charging session identification number, and a charging session start date and time; and
one or more non-transitory computer-readable media storing computer-executable instructions for a mobile device application configured to cause a computer processor of the mobile device to perform a method, the method comprising:
  authenticating a user to use the mobile device application on the mobile device;
  reading the encoded charging session data that is being displayed on the display screen of the electronic display device of the EVCS or EVSE using an image sensor on the mobile device, wherein the encoded charging session data that is displayed on the display screen of the electronic display device of the EVCS or EVSE includes the encoded data for the unique identification of the EVCS or EVSE, the unique charging session identification number, and the charging session start date and time;
  decoding the encoded charging session data, wherein the decoded charging session data includes the unique identification of the EVCS or EVSE, the unique charging session identification number, and the charging session start date and time;
  combining the decoded charging session data with user identification data identifying the user of the mobile device application to form a dataset;
  transmitting the dataset to a remote server; and
  receiving a response from the remote server, wherein the response indicates that a vehicle charging operation for the user is authorized at the EVCS or EVSE,
wherein the EVCS or EVSE is configured to deliver an electrical charge to one or more batteries of the electric vehicle via a respective one of the electrical connectors of the EVCS or EVSE on the remote server indicating that the vehicle charging operation is authorized at the EVCS or EVSE.

9. The system of claim 8, wherein the encoded charging session data is displayed as a result of the user making a selection via a touch screen interface at the EVCS or EVSE to use the mobile device application.

10. The system of claim 8, wherein the authenticating is performed by receiving a login identification and a password from the user.

11. A system comprising:
an internet-connected mobile device comprising:
  a computer processor;
  an image sensor; and
  a database storing mobile device user identification data; and
an electric vehicle charging station ("EVCS") or electric vehicle supply equipment ("EVSE") comprising:
  an electronic display device having a display screen; and
  one or more electrical connectors configured to provide an electrical coupling to an electric vehicle,
wherein the mobile device is configured to:
  read encoded charging session data from the display screen of the EVCS or EVSE via the image sensor on the mobile device, wherein the charging session data includes a unique identification of the EVCS or EVSE and at least one of (a) a unique charging session identification number, or (b) a charging session start date and time;

access said database on the mobile device that includes said mobile device user identification data; and wirelessly transmit the charging session data and the user identification data to a remote server, wherein the transmitted charging session data is transmitted includes the unique identification of the EVCS or EVSE and the at least one of (a) the unique charging session identification number, or (b) the charging session start date and time; and wherein the EVCS or EVSE is configured to:
upon receiving an indication from the remote server that a vehicle charging operation is authorized at the EVCS or EVSE based on the charging session data and the user identification data, perform the vehicle charging operation for an electric vehicle by supplying an electric current to the electric vehicle via the one or more electrical connectors.

12. The system of claim 11, wherein the encoded charging session data is encoded in a QR code or barcode.

13. The system of claim 11, wherein the mobile device is further programmed and configured to, prior to reading the encoded charging session data, authenticate a user by receiving a login identification and a password from the user.

14. The system of claim 11, wherein the charging session data includes each of the unique identification of the EVCS or EVSE, the unique charging session identification number, and the charging session start date and time; and wherein the charging session data transmitted includes the unique identification of the EVCS or EVSE, the unique charging session identification number, and the charging session start date and time.

* * * * *